Feb. 28, 1928.
T. A. BANNING, JR
1,660,641
METER AND THE LIKE
Filed July 25, 1924     5 Sheets-Sheet 1
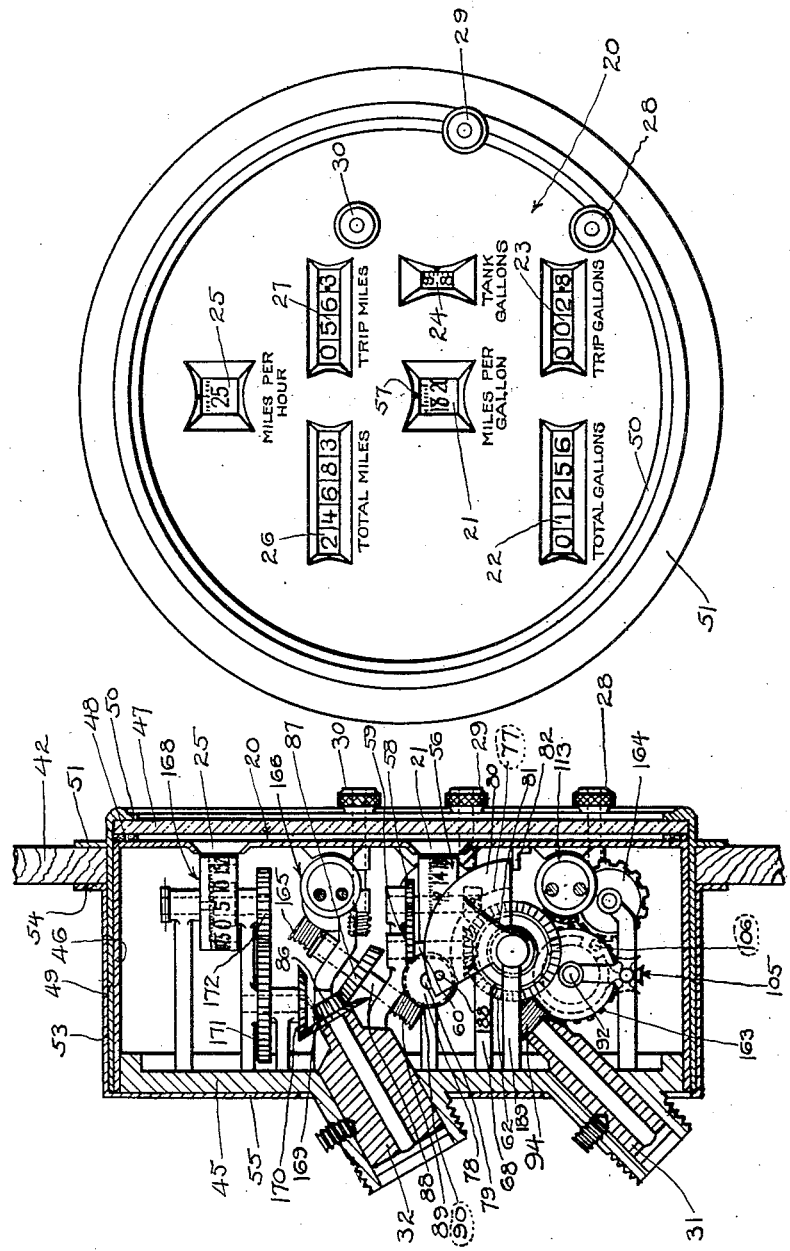
Inventor:
Thomas A. Banning, Jr.
by
Attys.

Feb. 28, 1928.

T. A. BANNING, JR 1,660,641

METER AND THE LIKE

Filed July 25, 1924

Inventor:
Thomas A. Banning, Jr.
by
Attys.

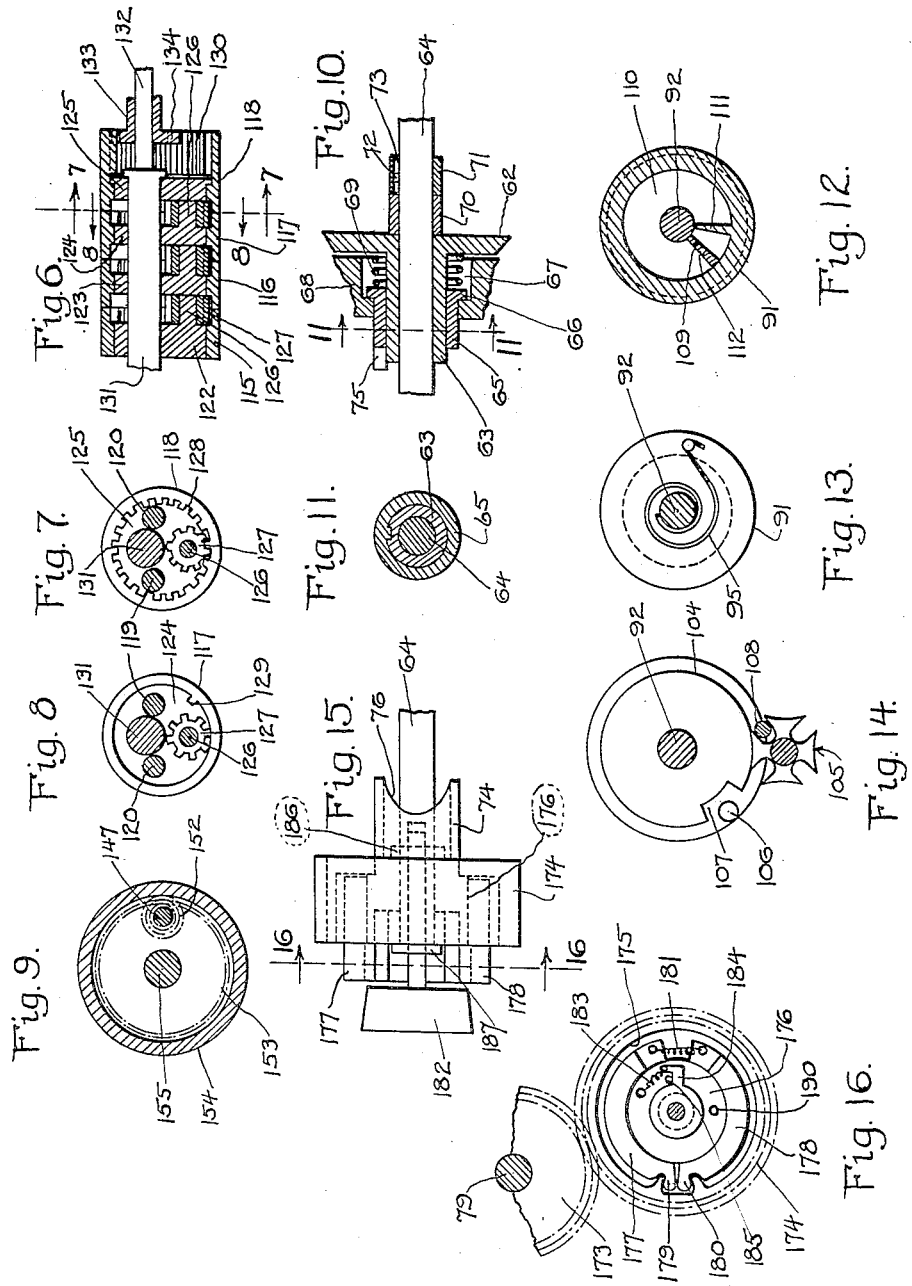

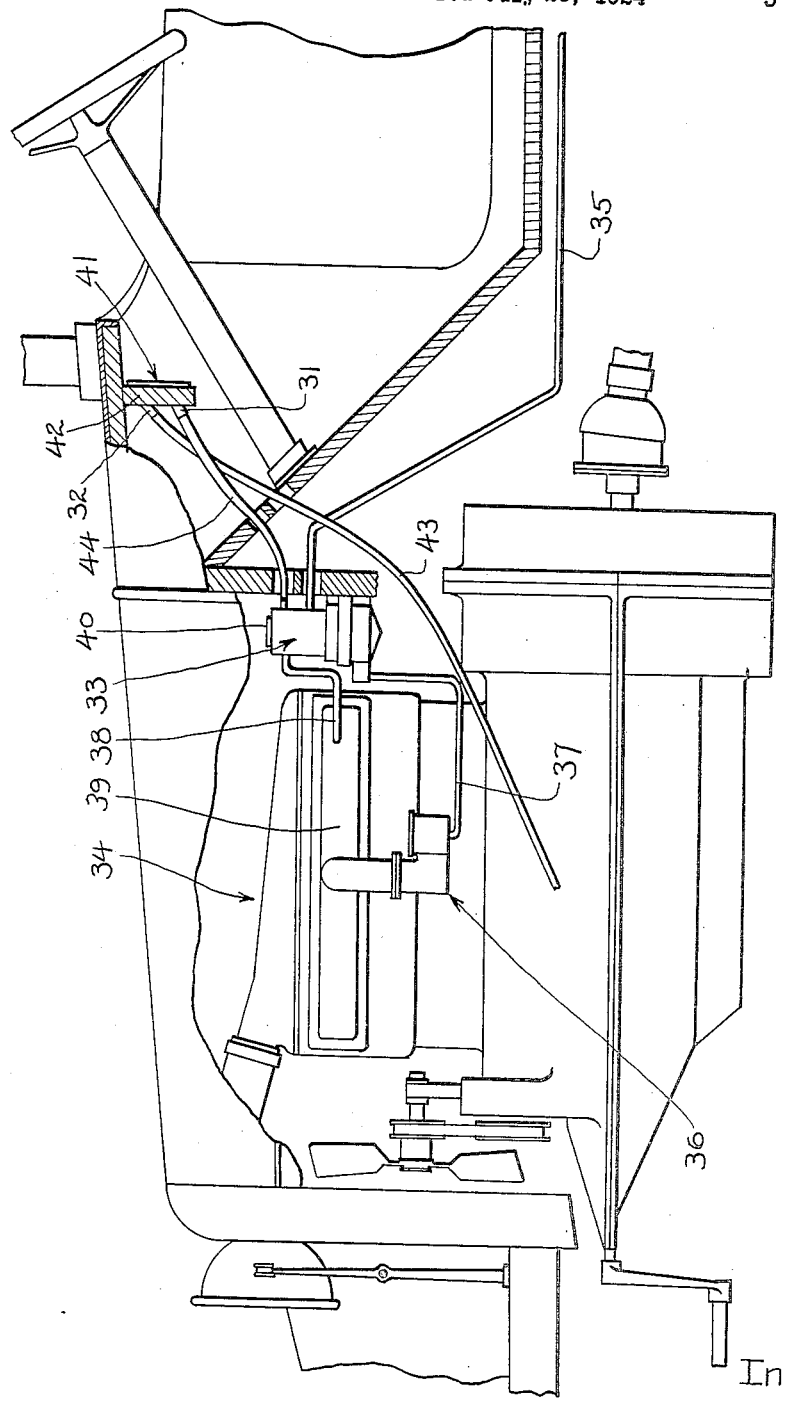

Feb. 28, 1928.
T. A. BANNING, JR
METER AND THE LIKE
Filed July 25, 1924
1,660,641
5 Sheets-Sheet 5
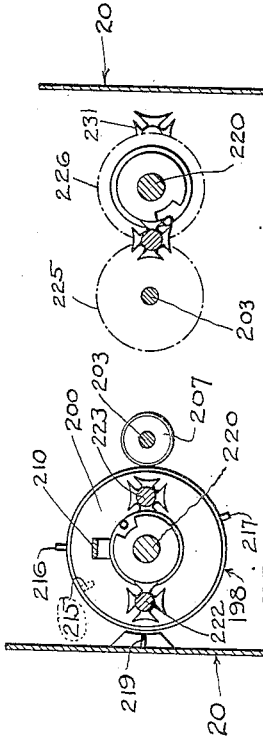
Fig. 20.
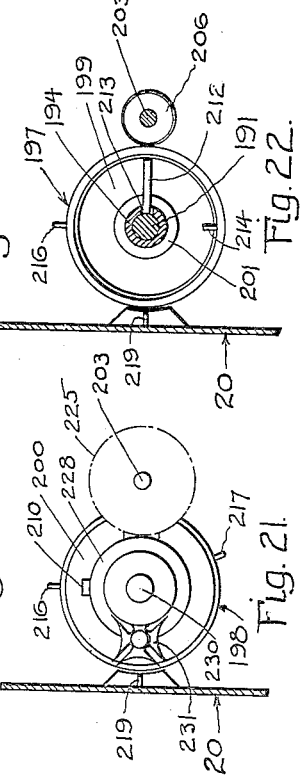
Fig. 19.
Fig. 22.
Fig. 21.
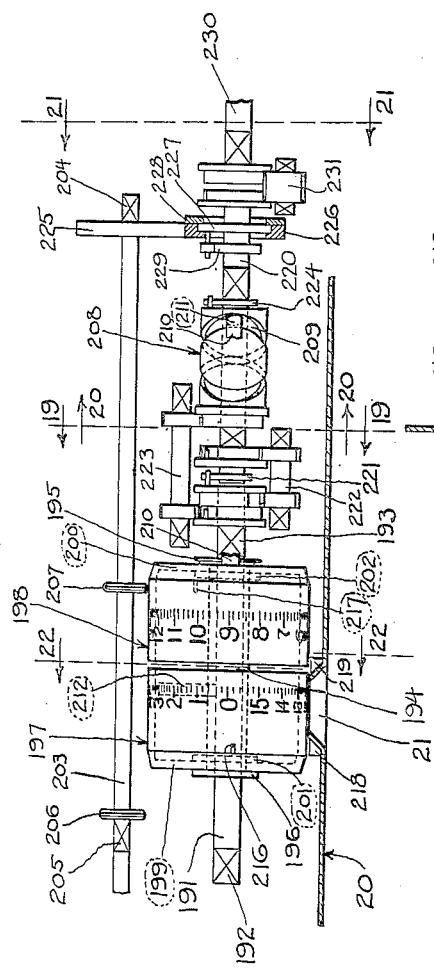
Fig. 18.
Inventor:
Thomas A. Banning, Jr.
by
Atty's.

Patented Feb. 28, 1928.

1,660,641

UNITED STATES PATENT OFFICE.

THOMAS A. BANNING, JR., OF WILMETTE, ILLINOIS.

METER AND THE LIKE.

Application filed July 25, 1924. Serial No. 728,208.

This invention has to do with certain improvements in meters and the like. The invention relates particularly to improvements in meters for measuring fuel and similar liquids, but it will presently appear that the features of the invention are not limited to this nor to any other particular class of service.

Furthermore, the present invention relates to improvements in meters capable of performing a number of different functions, among others being the ability to differentiate between two variables such as differentiating between the rate of flow of a fuel as compared to rate of travel of a vehicle. This is equivalent to determining the fuel consumed per unit of travel such as the miles per gallon obtained from the operation of the vehicle. In mentioning the operation of a vehicle, however, I wish it clearly understood that I do not intend to limit myself to the use of the features of the present invention in connection with vehicles, since manifestly, certain of said features may be used for differentiating between other variables, or for other purposes. Consequently, I do not intend to limit myself to the use in connection with vehicles, except as I may do so in the claims.

One of the objects of the invention is to provide an instrument of such construction and arrangement that it will give an indication of the miles per gallon from the operation of the vehicle, using the units miles and gallons for purposes of convenience only, since they are the standard units in use in this country. In this connection, a more particular object of the invention is to provide an indicating instrument of such construction that fairly average conditions of operation will be represented, as distinguished from the instantaneous conditions. By this is meant that one feature of the invention relates to the provision of an arrangement such that an indication will be periodically given of the average conditions of operation existing during operation for a previous amount of fuel or during operation of a given amount of another variable.
The particular arrangement illustrated is one in which an indication is given of the mileage traversed during the consumption of a definite quantity of fuel, such as a pint, a quart or a gallon, such indication remaining visible until the consumption of the next unit quantity of fuel, whereupon the indication will change to the correct amount to show the mileage for that particular unit quantity of fuel. The visible indication of the instrument, therefore, always shows what mileage was secured by the consumption of the preceding unit quantity of fuel.

This feature of the invention is of great value, since manifestly where the vehicle such as an automobile is being driven over road conditions which are momentarily changing, and is making starts and stops with intermediate periods of acceleration, running, coasting, and braking, with the opening of the throttle constantly varying more or less, it follows that the instantaneous differential between rate of fuel consumption and rate of travel will fluctuate within tremendous limits and with such rapidity as to be of little, if any, practical value. For example, with the motor running and the vehicle stationary the miles per gallon would be zero, while with the vehicle coasting and the engine shut off and disconnected, the miles per gallon would be infinite.

With instruments embodying the features of the present invention to which I have been referring, the average conditions are indicated, which average conditions are the ones in which the user is primarily interested; and the instrument can be so designed and constructed that the indication will be periodically corrected for relatively small quantities of fuel consumption so as to give as frequent an indication of the mileage conditions as may be desired.

Another object of the invention is to provide a unitary or combined instrument capable of accomplishing the foregoing results and also capable of giving the usual speedometer indications such as speed in miles per hour, trip miles, and total miles. In connection with this feature, it will be understood that the differentiation to secure miles per gallon involves an operating connection which will be actuated by the travel of the vehicle, as well as another connection which will be actuated by the flow of fuel. In the embodiment herein illustrated and particularly described, I have combined the speedometer mechanisms with those used for the fuel measurements in such a way that a single driving connection actuated by the travel of the vehicle suffices for the purposes of the speedometer mechanisms as well as the fuel measuring devices.

Another feature of the invention relates to the provision of summation or accumulating devices capable of measuring the actual quantity of fuel consumed, and in this connection, one object is to make provision for indicating both total gallons and trip gallons.

I will state at this point that the devices herein illustrated for measuring trip miles and trip gallons are so constructed that either or both of them can be sent back to zero or to any other point by the simple manipulation of a button or wheel convenient to the operator. Furthermore, it should be so designed that both the miles and the gallons of fuel consumed may be accumulated during any trip either long or short so as to ultimately obtain an exact measurement of the average miles per gallon secured. It will be understood, however, that the comparison so secured is quite independent of the periodical indications normally given and which take place periodically after the consumption of each unit of fuel.

A further feature of the invention relates to the provision of means for indicating the quantity of fuel carried in the tank. This will give the operator a constant and visible indication of the remaining fuel supply, which indication will constantly change with the consumption of the fuel, so that the operator is always informed concerning the fuel available. In this connection, a further object is to so arrange the mechanisms that the indication will be given in gallons or other suitable units, and this indication will read backwards as compared to the other indications of fuel accumulation, since manifestly, the amount of fuel available in the tank will decrease as the fuel is consumed.

A further object of the invention is to make provision for all of the foregoing as well as other desirable results within a unitary instrument suitable for use on the dash board of a vehicle. In this connection, a further object is to relate the various indicating elements of such instrument to each other in such a way that they can be most conveniently and readily observed and made use of by the operator taking account of the various functions and indications for which they are intended.

Other objects are to provide an instrument of simple form and rugged construction, and one which can be manufactured at comparatively low cost and will be very durable and serviceable.

Other objects and uses of the invention will appear from a detailed description of the same, which consists in the features of construction and combinations of parts hereinafter described and claimed.

In the drawings:

Figure 1 shows a face view of an instrument embodying the features of the present invention;

Fig. 2 shows a vertical section through the instrument of Fig. 1, and may also be considered as a section taken on the line 2—2 of Fig. 3, looking in the direction of the arrows;

Fig. 6 is a detail section taken on the line 6—6 of Fig. 3, looking in the direction of the arrows, but on enlarged scale;

Fig. 7 is a cross section taken on the line 7—7 of Fig. 6, looking in the direction of the arrows;

Fig. 8 is a cross section taken on the line 8—8 of Fig. 6, looking in the direction of the arrows;

Fig. 9 is a detailed section, on enlarged scale, taken on the line 9—9 of Fig. 3, looking in the direction of the arrows;

Fig. 10 is a detailed section, on enlarged scale, taken on the line 10—10 of Fig. 5, looking in the direction of the arrows;

Fig. 11 is a cross section taken on the line 11—11 of Fig. 10, looking in the direction of the arrows;

Fig. 12 is a detailed section, on enlarged scale, taken on the line 12—12 of Fig. 5, looking in the direction of the arrows;

Fig. 13 is a detailed section, on enlarged scale, taken on the line 13—13 of Fig. 5, looking in the direction of the arrows;

Fig. 14 is a detailed section taken on the line 14—14 of Fig. 5, looking in the direction of the arrows;

Fig. 15 is a detailed side view of a modified form of registering mechanism making use of a clutch;

Fig. 16 is a section taken on the line 16—16 of Fig. 15; looking in the direction of the arrows;

Fig. 17 is a fragmentary view of an automotive vehicle having applied thereto an instrument embodying the features of the present invention, and showing more or less diagrammatically the manner in which the connections from the front wheel and from the fuel measuring device may be established to said instrument.

Figures 3, 4, 5:
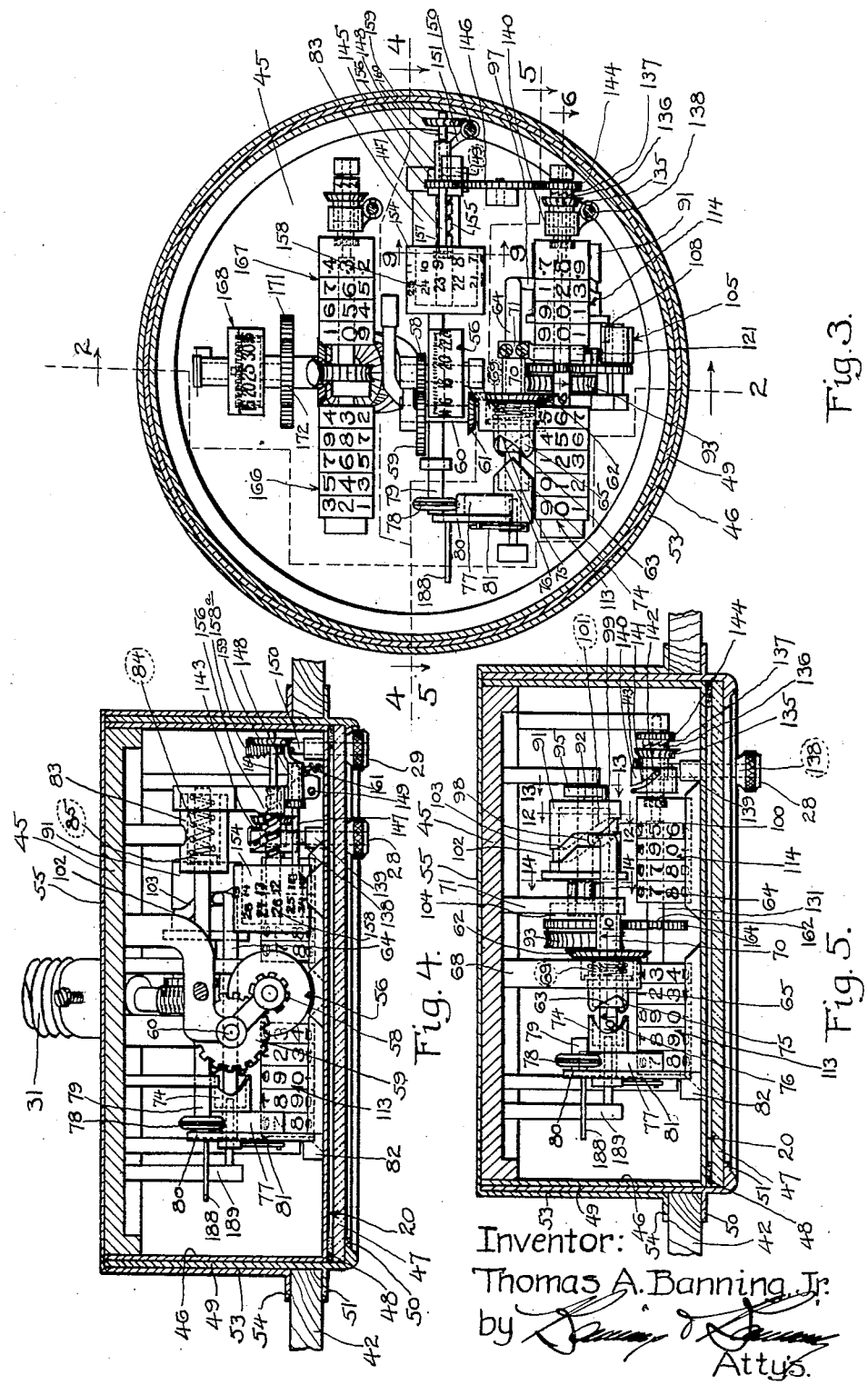
Fig. 3 is a view similar to that of Fig. 1, with the exception that the front portion of the casing and the front cover or dial plate have been cut away so as to better reveal the interior construction of the device.
Fig. 4 is a horizontal section taken on the line 4—4 of Fig. 3, looking in the direction of the arrows.
Fig. 5 is a horizontal section taken on the line 5—5 of Fig. 3, looking in the direction of the arrows.

Fig. 18 is a longitudinal view partly in section showing a modified construction of instrument for indicating the miles per gallon; and Figs. 19, 20, 21 and 22 are cross sections taken on the lines 19—19, 20—20, 21—21 and 22—22 of Fig. 18, looking in the direction of the arrows.

Referring first to Fig. 1, I have for the purpose of convenience shown the features of the present invention as included within a circular instrument having a dial plate 20. The various mechanisms presently to be explained are so related that the miles per gallon are indicated through the dial plate by a more or less central opening 21, and the total gallons and trip gallons are conveniently visible through dial plate openings 22 and 23 which are conveniently located below the position of the opening 21. The tank gallons are indicated through an opening 24 at one side of the miles per gallon indication, and the various speedometer indications are conveniently placed above those already mentioned. For this purpose the speed in miles per hour appears through an opening 25, the total miles through an opening 26, and the trip miles through an opening 27 all located in the upper portion of the instrument, for purposes of convenience.

I have also shown a button 28 by which the reading of the trip gallons can be adjusted, a button 29 by which the reading of the tank gallons can be adjusted, and a button 30 by which the reading of the trip miles can be adjusted. The resetting of the trip gallons and trip miles readings will ordinarily be performed where an observation of performance is to be made over an extended distance. The resetting of the reading of tank gallons will ordinarily be performed each time additional fuel is taken into the tank, this reading being increased depending upon the amount of additional fuel so loaded.

Reference particularly to Fig. 2 also discloses the rearwardly projecting connections 31 and 32 to which may be attached driving devices actuated by the flow of fuel and by the travel of the vehicle respectively. The connection 32 will ordinarily be driven by a flexible shaft from one of the front wheels in accordance with well understood practice with speedometer operation, so that the connection 32 is rotated proportionately to the travel of the vehicle. In those cases in which speed indications are to be given in the instrument, the connection 32 should be driven at a speed which will make it feasible to get suitable speed indications, but as far as the features of the fuel measurements and indications are concerned it will suffice that the connection 32 be rotated proportionately to the linear travel of the vehicle.

The connection 31 is to be driven by the flow of fuel, and each revolution of this connection 31 will represent the passage of a certain amount of fuel. It is, therefore, desired to drive the connection 31 proportionately with respect to the fuel flow, and this can be done in any convenient manner. For example, a suitable metering device may be placed in the fuel supply line leading to the engine, which metering device will rotate the connection 31 through the medium of a flexible shaft in exact accordance with the delivery of fuel to the engine. Any suitable metering device may be used for this purpose and I do not herein concern myself particularly with its details of construction. It is noted, however, that a suitable construction and device for this purpose should be such as to accurately meter the flow of fuel at low rates of demand as well as high, so that the connection 31 will be exactly rotated according to the quantity of fuel delivered, and at the same time such metering device should be so constructed that it will not impede or interfere with the proper flow of fuel to the engine nor in other ways affect the proper operation of the vehicle. I have devised and invented an apparatus responding to the requirements above enumerated, and have shown a conventional external view of the same at 33 in Fig. 17 of this case.

In Fig. 17, I have shown diagrammatically a metering device 33 which meters the fuel delivered to the engine 34. This metering device receives the fuel from the supply tank by a line 35 and delivers it to the engine carburetor 36 by the line 37. The particular metering device illustrated may be provided with a connection 38 connecting to either the exhaust side or the intake side of the engine, and in the particular arrangement shown diagrammatically in Fig. 17, this connection 38 leads into the intake manifold and may be operated by the suction of the engine. As far as the features of the present invention are concerned, the operation of this metering device can be performed either internally, or by the use of external power, such as the pressure of the exhaust side of the engine or the suction of the intake side, or in any other way.

The metering device is shown as also provided with a dial 40 upon which are indicated the total quantity of fuel passed through the apparatus.

An instrument embodying the features of the present device is shown diagrammatically at 41 on the dash board 42 and in position for convenient observation by the driver. The flexible shaft 43 leads from one of the front wheels to the meter connection 32, and the flexible shaft 44 leads from the metering device 33 to the connection 31.

The meter particularly illustrated includes a base block 45 upon which are mounted or journaled the various elements. The dial plate 20 is shown as having a rearwardly extending flange 46 which sets around the edge of the base block 45. A window 47 of plate glass or the like is placed in front of the dial plate 20 from which it is separated by a gasket 48 of rubber or the like. A cylindrical flange 49 surrounds the flange 46 and also reaches to the rear end of the instrument. This flange 49 has at its front end a lip 50 which sets down over the edge portion of the window 47. It also has a lip 51 which sets against the front face of the dash board 42. Another flange 53 is set over the flange 49, being provided with a lip 54 at its front end which sets against the back face of the dash board 42. The flange 53 is also shown as having a back plate 55 which can be drawn against the base block 45 in order to hold it in place and in order to clamp the instrument in position on the dash board.

Within the instrument is mounted an indicating dial 56 upon whose surface are placed indications of miles per gallon, so that the same are visible through the opening 21. The indicating dial 56 can be moved so as to present the proper indication to the opening 21. This opening is properly provided with an arrow head 57 to designate the point of exact reading.

The indicating dial 56 illustrated is cylindrical in form and works on a vertical axis. It is provided with a pinion 58 which meshes with a gear 59 on a stub shaft 60 whose lower end carries a bevel pinion 61. A bevel gear 62 meshes with the pinion 61 and is provided with a flange 63 which turns freely upon a horizontal rod 64 (see Fig. 10 in particular). Rotation of the bevel gear 62 will cause rotation of the indicating dial 56 in order to change the reading at the opening 21. A sleeve 65 is splined on the flange 63, so that said sleeve can move back and forth, but so that the two parts rotate in unison. The sleeve 65 has a collar 66 working within a recess 67 of the stationary bracket 68, and a spring 69 located within said recess exerts pressure between the bevel gears 62 and the collar 66 tending to hold said collar against the stationary bracket 68, so that sufficient friction will be generated to prevent rotation of the sleeve 65 and flange 63 due to jarring or vibration of the vehicle during travel.

The position of the bevel gear 62 is determined by a collar 70 resting against the stationary bracket 71, so that the bevel gear is held in proper place and in mesh with the bevel pinion notwithstanding the pressure of the spring 69. The rod 64 can slide back and forth in the bracket 71 but is held against rotation by a pin 72 working in a slot 73 of said bracket.

Journaled upon the rod 64 is a cam block 74. The sleeve 65 and cam block 74 have companion cam faces 75 and 76 respectively, so that when these two parts are brought together with registered angularity they set into each other. On the other hand if they are not in registered angularity when brought together, one or the other must rotate before their registration can be completed. Any turning of the cam face 75 by the cam face 76 of the cam block 74 in order to bring about angular registration, will result in rotating the indicating dial 56 in one direction or the other depending upon the lack of harmony between the cam block and the sleeve.

The arrangement is such that the cam block 74 normally stands at a neutral or zero angular position, so that if registered with the sleeve 65 when in such angular position, the indicating dial 56 will read zero through the opening 21, and the travel of the vehicle causes rotation of the cam block 74, so that upon completion of consumption of a unit quantity of fuel, said cam block will have turned through an angle proportionate to the amount of road travel. Thereupon, by causing the sleeve 65 to turn into an angular position of registry with the cam block, the position of the indicating dial will be caused to represent the road travel per gallon of fuel.

Assuming that the indicating dial and the sleeve 65 already stand at a given position, the indication of the dial will be either increased or decreased when the cam block and sleeve are next registered depending upon whether or not a greater or less mileage per gallon has been effected by the consumption of the unit quantity of fuel just used than was previously effected.

The cam block 74 is provided with a segmental cylinder 77 against which operates a friction wheel 78 mounted on a shaft 79 which is rotated by the travel of the vehicle. A flange 80 is provided adjacent to the segmental cylinder 77. A spring 81 normally turns the segmental cylinder and flange to a neutral position as limited by a fixed stop 82, see Fig. 2. The rotation of the shaft 79 due to travel of the vehicle turns the cylinder and flange towards the left in Fig. 2, and away from the stop 82 and against the spring 81. After a unit quantity of fuel has been consumed, the rod 64 is drawn to the right in Fig. 3 so as to bring the cam block and sleeve 65 together. The end of the shaft 79 rests against the flange 80, so that the friction wheel 78 and segmental cylinder 77 are kept in frictional engagement while the rod 64 is drawn to the right in order to register the cam block against the sleeve, and consequently, the cam block is held against backward movement during its registering operation. Consequently, the registration of the cam block and sleeve takes place while the angular position of the cam block still represents the road travel of the vehicle.

Immediately after the registration of the parts has been effected the rod 64 is moved to the left beyond the position shown in Figs. 3, 4 and 5, a sufficient amount to carry the segmental cylinder 77 away from the friction wheel 78, so that the restraining influence of the friction wheel is removed and the segmental cylinder is restored to its initial angular position against the stop 82 by the spring 81. Immediately thereafter the rod 64 is again drawn towards the right a sufficient amount to carry the segmental cylinder 77 beneath the friction wheel 78 so as to again bring these parts into engagement, but this new engagement takes place with the cam block again standing at the zero angular position.

The shaft 79 is slidably journaled in suitable bearings, and its right hand end sets into a box like structure 83 within which is placed a spring 84. This spring 84 operates againts a collar 85 on the shaft 79 tending to hold said collar against the left hand wall of the box 83, at which position the friction wheel 78 stands in the position shown in Figs. 3, 4 and 5. This arrangement permits the shaft 79 to be moved to the right during registration, but limits the leftward movement of the shaft 79, so that the segmental cylinder 77 will draw away from the friction wheel 78 in the proper manner.

The shaft 79 is driven by the connection 32 through the medium of a bevel pinion 86 meshing with a bevel gear 87 on a short shaft 88. The lower end of this shaft 88 carries a worm 89 which meshes with a worm gear 90 which is splined to the shaft 79, so that said shaft can move back and forth in the manner already explained. Thus the friction wheel 78 is driven by the travel of the vehicle.

The movement of the rod 64 towards the right during the act of registering the parts should be sufficient to insure full registration of the cam block and sleeve. For this purpose, I prefer to cause the rod 64 to move a slightly greater distance than is actually necessary to cause such transference, and for this purpose, I establish the yielding connection under the influence of the spring 69 already explained. This spring 69 also causes the collar 66 to bear against the stationary bracket 68 with sufficient pressure to establish a frictional connection after the registration has been completed, so that the jarring of the vehicle will not cause the indicating dial to change its reading until the next unit quantity of fuel has been consumed.

The movements of the rod 64 can be accomplished in any convenient manner, it being understood, however, that the transference of registration and the resetting of the cam block to zero should take place periodically with the completion of each unit quantity of fuel consumption. Furthermore, the movements should be practically continuous and sufficiently rapid to insure transference of the registration and resetting to zero and re-establishment of normal conditions in such a relatively short interval of time that the amount of travel of the vehicle during these operations will be practically negligble as compared to its travel during the consumption of the unit quantity of fuel. For example, if the vehicle should travel one hundred feet during these operations as compared to a travel of four miles during the consumption of the unit quantity of fuel, the error so occasioned would be so minute in percentage as not to effect the practical operation and reading of the instrument.

The particular arrangement illustrated for causing the movement of the rod 64 includes a drum 91 mounted for rotation upon a horizontal shaft 92, which shaft in turn is driven by a worm gear 93 from the connection 31 through the medium of a worm 94. The arrangement is such that the worm gear and shaft complete one revolution during the consumption of the unit quantity of fuel, for example, a quart. The drum 91 is free to rotate on the shaft 92, but a spring 95 joins these parts together in such a manner that the drum tends to follow the shaft. Nevertheless, the drum can be restrained from following the shaft for a complete revolution, whereupon, when released, the spring will cause the drum to effect a revolution and catch up with the position of the shaft.

On the surface of the drum there is formed a slot 96 into which reaches the finger 97 on the end of the rod 64. This slot will cause the rod to move back and forth in the desired manner. The slot includes a neutral dwell 98, a cam shaped section 99 to draw the rod to the right, a dwell 100 at the position of extreme right hand movement, a cam shaped portion 101 to restore the rod to the extreme left hand position, a dwell 102 at such position, and a cam shaped portion 103 to restore the rod to its initial position. Consequently, while the drum completes one revolution the rod is first drawn to the right and held there momentarily, then forced the extreme extent of movement to the left and held there momentarily, and then restored to the central or neutral position whereupon the rotation of the drum ceases.

The act of causing the drum to effect its revolution with reasonable quickness and under proper control at the completion of the unit quantity of fuel can be effected in any convenient manner, but in the present case I have illustrated a star wheel construction for accomplishing these results. For this purpose the shaft 92 carries a disk 104 against which rides a star wheel 105. The disk 104 is provided with a star wheel pin 106 and notch 107, so that when the disk completes a revolution the star wheel will be notched over. The drum 91 carries a pin 108 which is properly positioned with respect to the star wheel to be able to engage the notches of the star wheel and pass through them as the star wheel is notched over. Examination particularly of Fig. 3 shows that the star wheel if of double length and is thus able to take care of the movements of the pin 108 as well as those of the pin 106.

In some cases it may be found desirable to regulate the control of the drum when it is released, and as it makes its revolution following the shaft. This may become desirable since the use of a spring 95 of proper strength to perform the drum movements may in some cases cause a too rapid movement during some portions of the movements of the drum. I have, therefore, provided a regulating device shown in Fig. 12. The same includes a flange 109 mounted on the shaft 92 within the chamber 110 on the inside of the drum and another co-operating flange 111 on the drum itself. The two flanges together with the walls of the drum provide relatively tight compartments on the inside of the drum. One of the partitions 109 or 111 may be provided with a relatively small perforation 112 through which air or oil within the drum may flow under control. While the drum is held stationary by the star wheel the partition 111 remains stationary and the partition 109 travels away from it in the clockwise direction when viewed as in Fig. 12. This travel is relatively slow and depends upon the rate of fuel consumption. The air or oil is therefore able to easily pass through the perforation of the partition 109.

Just about the time this partition reaches the other face of the partition 111, the star wheel is released and the drum together with the partition 111 immediately commences rotary travel towards the partition 109 under the influence of the spring 95. The rate of this travel will be controlled by the flow of the oil or air through the perforation 112, so that the back and forth movements of the rod 64 will not take place at excessive speed.

Suitable accumulating devices 113 are illustrated for accumulating total gallons and other accumulating devices 114 are illustrated for accumulating trip gallons. These accumulating devices may or may not be used depending upon the design of the instrument, since manifestly, the mechanisms for giving miles per gallon will operate independently of them if desired. Nevertheless, in many cases these accumulating devices will be used, and they bear a peculiar relationship to the miles per gallon apparatus when so used.

Furthermore, different forms and constructions of the accumulating mechanisms are available and I do not intend to limit myself to any particular form of these devices except as I may do so in the claims. I have, however, illustrated a particular form of accumulating devices in detail in Figs. 6, 7 and 8, and will now describe the same as being a typical construction. This particular accumulating device includes the cylinders 115, 116, 117 and 118 set side by side and upon whose surface are formed the numerals reading from one to zero inclusive. The unit accumulator includes a pair of longitudinal rods 119 and 120 which are held stationary, for this purpose, being carried by a suitable bracket such as 121 (see Fig. 3).

Mounted on the rods 119 and 120 are the stationary cylindrical blocks 122, 123, 124 and 125 corresponding to the dial cylinders 115, 116, 117 and 118 respectively. Each of these blocks 122, 123, 124 and 125 has a sidewise projecting pin or lug 126 upon which is placed a carrying wheel 127.

Each dial cylinder has on its right hand face an internal gear 128 which meshes with the pinion 127 of the next lower order; and each of said dial cylinders has on its left hand end an internal tooth 129 which is also adapted to engage the pinion 127 of the next higher order each time such cylinder completes a revolution. Consequently, as each cylinder of lower order completes a revolution its tooth 129 will engage the adjoining pinion 127 and notch the same over, thereby simultaneously causing the dial cylinder of next higher order to carry tens. By properly proportioning the teeth as compared to the numerals on the faces of the dial cylinders the proper carrying action will take place from order to order.

This accumulating unit presents the advantage that it is very simple and rugged in construction, and furthermore, it is possible to bring the faces of the adjacent cylinder dials into close connection with each other, so that a practically continuous surface is presented for observation.

The dial cylinder 118 for the lowest order may be driven in any convenient manner, but preferably by the use of an internal gear 130. A shaft 131 extends over far enough to drive the right hand dial cylinder of the accumulating unit 113, and said shaft extends through the body portion of the accumulating unit 114 to the right hand thereof as clearly shown in Fig. 6. At this point the size of said shaft 131 is reduced, as shown at 132 and the sleeve 133 is loosely mounted thereon. This sleeve 133 has a pinion 134 which meshes with the internal gear 130. Said sleeve 133 reaches towards the right a substantial distance and carries at its right hand end a spiral or worm gear 135 on the right hand face of which is a clutch element 136.

The reduced shaft 132 reaches still further to the right and carries another clutch element 137 which rotates continuously with rotation of the shaft 132.

The sleeve 133 and gear 135 can be slid back and forth on the reduced shaft 132 so as to engage or disengage the clutch elements 136 and 137. During such movements the pinion 134 maintains its driving connection with the internal gear 130.

The resetting button 28 for the trip gallons accumulator 114 is mounted on a short shaft 138 which can be pulled in and out with respect to the dial plate 20, the dial plate being provided with a sleeve 139 in which this shaft 138 is journaled. A yoke 140 embraces the sleeve 133 and has the cam slots 141 which receive the pins 142. This yoke 140 is connected to the shaft 138, so that as said shaft is brought back and forth the yoke is also moved back and forth, and consequently, the sleeve 133 is shifted lengthwise with respect to the reduced shaft 132.

The shaft 138 has a worm 143 which comes into mesh with the worm gear 135 when the resetting button 28 is drawn out, so that when the clutch faces 136 and 137 have been disengaged, the worm enters into driving connection with the worm gear. It thus becomes possible to reset the trip gallons accumulator when the button 28 has been pulled out.

The reduced shaft 132 also carries at its end a pinion 144. This pinion drives another pinion 145 through the medium of an idler 146. The pinion 145 is mounted on a shaft 147 which is carried in a journal 148 of a bracket element which is pivoted to a stationary part at the point 149, as clearly shown in Fig. 4.

The resetting button 29 for tank gallons is connected to a shaft 150 and can be pulled in and out. A finger 151 connects the pivoted journal 148 with the shaft 150, so that as the button 29 is pulled out the shaft 147 is tilted. This is possible because of the slight play permitted between the pinion 145 and the idler 146.

The shaft 147 carries at its left hand end a pinion 152 which normally meshes with an internal gear 153 on a drum 154. This drum is carried by a shaft rod 155 which works in a bearing 156. Said shaft rod and bearing are provided with helical threads 157 of rather steep pitch and the shaft 155 is rigidly connected to the drum 154, so that the two rotate together. Consequently, rotation of the drum is accompanied by its longitudinal displacement by reason of the helical threads 157.

The numerals 158 representing tank gallons are formed in spiral fashion around the surface of the drum 154, and the pitch of this spiral is the same as that of the thread 157, so that as the drum rotates the various numerals are successively presented to the opening 24.

The pinion 152 on the shaft 147 rotates proportionately to the fuel consumption, and consequently, the drum 154 is rotated proportionately to the fuel consumption assuming that the pinion 152 is in mesh with the internal gear 153. The numerals on the face of the drum are so arranged that the rotation of such drum by the fuel consumption causes the numerals to be presented to the opening 24 in reversed order, that is, from higher to lower numerals with consumption of fuel. In this way the indication through the opening 24 becomes less and less as the fuel is consumed.

The resetting shaft 150 of the button 29 has a worm 158$^a$ which comes into engagement with a worm gear 159 on the shaft 160 when the button 29 is drawn out. The shaft 160 is splined to the drum shaft 155, so that when the resetting button 29 is pulled out and rotated, the drum can be turned. As this operation takes place, the shaft 147 is also tilted so as to carry its pinion 152 away from the internal gear 153 to permit the worm to be rotated for resetting purposes without rotation of the various gears which are connected to the fuel drive.

The indications of tank gallons are based on the assumption that the reading of gallons on the face of the cylinder dial 154 correctly represents the reducing quantity of fuel due to its consumption. If the instrument is properly calibrated and if the connection 31 is porperly driven due to a correct metering of the fuel by the apparatus 33, the readings appearing through the opening 24 will decrease in exact harmony with the fuel consumed. If under these conditions the button 29 is properly manipulated, to increase the reading through the opening 24 by the proper amount each time fuel is loaded, the correctness of these readings will continue with a high degree of accuracy. It may, however, become desirable to check the tank gallon readings occasionally in order to be sure that the instrument checks with the existing conditions. This can easily be done by completely filling the fuel tank from time to time, as for example, once a month, and resetting the tank gallon indicator to read the known amount of the full capacity of the tank each time this is done.

In order to be sure that the shaft 147 will also be thrown back so as to carry the pinion 152 into mesh with the internal gear 153 after resetting, I have shown a spring 161 which tends to shift the bracket 148 for this purpose.

The shaft 131 which drives the accumulators for total gallons and trip gallons, and the tank gallon indicator, is to be driven in proper harmony with the flow of fuel. For this reason, the shaft 131 has a pinion 162 which is driven from a gear 163 on the shaft 92 through the medium of an idler 164.

The numerals on the accumulators 113 and 114 and on the tank gallons indicator should be so related to each other, taking account of the gearing which connects them together, that as fuel is consumed the readings of the accumulators 113 and 114 will increase in amount, whereas, the reading of the tank indicator decreases in amount.

In those cases in which the meter is to be provided with speed indicating mechanisms or mileage accumulators for total miles or trip miles or both, the same can be conveniently driven from the same connection 32 which is used for the purpose already explained. I have, therefore, shown the stub shaft 88, which drives the shaft 79, as being also provided with a worm 165 which operates an accumulator 166 for total miles and another accumulator 167 for trip miles. The construction of these accumulators is within the discretion of the designer and may be of the general type illustrated in Figs. 6, 7 and 8, or of any other suitable type. It is noted, however, that the gearing should be such that these accumulators will correctly indicate the actual distance, and, therefore, they bear a peculiar relationship to the gear ratio, of the shaft 79 and segmental drum 77.

When it is desired to indicate speed, any suitable speedometer mechanism 168 may be used, the same being driven from the connection 32 by means of bevel gears 169 and 170, and spur gears 171 and 172. I do not herein concern myself particularly with the construction of this speedometer mechanism, since any suitable construction may be used, but in this case also the gear ratio should be proper to give a correct reading of speed, and, therefore, bears a peculiar relationship to the connection to the shaft 79 and segmental drum 77.

In Figs. 15 and 16 I have shown a modified construction of registering mechanism by means of which the cam block 74 is rotated for the purpose of accumulating an angular displacement of correct amount depending upon the mileage traversed, and for maintaining such angular displacement until transferred to the cam surface 75, and for restoring the cam block back to the zero position preparatory to accumulating a new reading. For this purpose, the shaft 79 is in this case provided with a gear 173 which meshes with a gear 174 having a relatively broad face, so that said gear 174 can be shifted back and forth with respect to the gear 173 while maintaining the proper mesh. The gear 174 has a cylindrical chamber 175, and the cam block 74 is provided with a drum 176 within said chamber. Within the chamber 175 of the gear 174 is placed a pair of clutch shoes 177 and 178 which are pivoted to the gear 174 at the points 179 and 180 respectively. A spring 181 tends to draw these clutch shoes together so as to firmly grip the drum 176 and thus establish a firm driving connection from the gear 174 to the cam 74. The amount of this clutching action is sufficient to effectively prevent any slippage of the cam block 74 during the process of transferring the reading to the cam surface 75 of the sleeve 65.

Mounted to one side of the mechanism just described is a stationary cone block 182, and the clutch shoes 177 and 178 can be forced upon said cone by moving the gear 174 and associated parts sidewise towards the left in Fig. 15. Thereupon the clutch shoes will be spread apart and the drum 176 released. A spring 183 joins the drum to a finger 184 on the end of the rod 64, so that immediately upon releasing the clutch shoes, the drum together with the cam block 74 will be drawn back to the zero or neutral position until limited by a stop pin 185.

In order to effect the proper back and forth movements of the parts by actuation of the rod 64, I have shown the flanges 186 and 187 on said rod at opposite sides of the gear 174 and drum 176 just described.

With this modified arrangement, the gear 174 also remains in mesh with the pinion 173, and consequently, its angular position is always correct from the commencement of an accumulating operation until the termination thereof, as well as during the entire process of registering the reading onto the sleeve 65. No slippage of parts can take place.

It will be noted that a proper transference of reading from the cam block 74 to the indicating dial 56 for miles per gallon contemplates a proper registry of the cam surfaces 75 and 76. In the construction illustrated, the cam block 74 should not make more than a quarter revolution from its zero reading to the position of maximum travel of the vehicle before transference of the reading to the cam surface 75. Otherwise, the positions of the two cam surfaces would become inverted and the sleeve 65 would be rotated in the wrong direction. It is nevertheless, desirable to be able to use the entire periphery of the indicating dial 56 for showing miles per gallon so as to be able to spread out the readings as much as possible in order to increase the capacity and accuracy of the instrument. I have, therefore, illustrated the gearing connections between the sleeve 65 and the dial 56, including the bevel gears 61 and 62 and the spur gears 58 and 59. The use of these gears makes it possible to multiply the angular movement from the sleeve 65 to the dial 56 by the ratio of four to one or even more, so that it is possible to use the entire periphery of the dial 56 without more than a quarter turn of the sleeve 65.

Manifestly, any other suitable arrangement may be adopted, but the foregoing feature is noted in connection with the construction herein illustrated.

It is also noted that the instrument should be so designed with respect to the service to be performed that the segmental drum 77 and cam block 74 will not make more than a quarter turn during the consumption of the unit quantity of fuel, at which time the reading is transferred to the dial. Consequently, the instrument should be so designed with respect to the service to be performed that the mileage traversed in the consumption of such unit quantity will not exceed the maximum probable mileage which such vehicle will ever accomplish on the unit quantity of fuel.

This being the case, a quarter turn of the segmental drum 77 will represent such maximum probable mileage, and in order to increase the accuracy and range of usefulness of the instrument, I prefer to so arrange the parts that the transference will take place with reasonable frequency, so that a relatively small linear travel will make a reasonable amount of angular change in the position of the segmental drum. If, for example, the instrument is to be used on vehicles which will probably never give more than thirty miles per gallon, and if when used on such vehicles, the registration is transferred at the completion of every quart or quarter gallon, it will be evident that the one half turn of the segmental drum will represent not to exceed seven and one half miles. On the contrary, if the transference were to take place at the completion of each gallon instead of each quart, the half turn of the segmental drum would represent 30 miles instead of seven and one half, in which case the accuracy of the instrument would only be substantially one fourth of what it would be in the case of a transference at the completion of each quart. It is observed, however, that in any case the dial 56 can be made to read in miles per gallon regardless of the frequency with which the transference is accomplished.

In some cases the maximum probable mileage for which the instrument is designed might be exceeded, as for example in a case where the vehicle were to be towed a considerable distance, or where it was operated a long distance on down grade. In such case the segmental drum and cam block 74 would override, and the transference could not be properly effected. I have, therefore, illustrated a stop pin 188 reaching sidewise from the flange 80 to a position where it will strike a stationary part such as the bracket 189 just before the quarter turn is completed, thus arresting any further movement of the segmental drum notwithstanding the continued rotation of the shaft 79 and friction wheel 78. When the segmental drum is thus locked, the friction wheel 78 will slip until the unit quantity of fuel is completed, whereupon there will be transferred to the indicating dial 56 a reading of the maximum amount within the capacity of the instrument. No harm will thus be done to the instrument or parts, and when the unit quantity of fuel is completed, the cam block and segmental drum will be returned to the zero position ready to meter the mileage for the next unit quantity of fuel.

In the case of the modified construction shown in Figs. 15 and 16, an excessive amount of mileage can be taken care of without any harm to the instrument other than an incorrect reading, due to the fact that in such case, the gear wheel 174 and clutch shoes 177 and 178 will slip with respect to the drum 176 when the rotation of said drum is arrested by engagement of the pin 190 with the finger 184, as shown in Fig. 16.

Considering the modified arrangement shown in Figs. 18, 19, 20, 21 and 22, I will state that in these figures I have shown a modified arrangement of instrument for showing miles per gallon and I associated the same with the dial plate of an instrument, although I have not in these particular figures shown the details of construction of various accumulating devices for accumulating total gallons, trip gallons, total miles and trip miles, nor for indicating the tank gallons nor the speed in miles per hour. Nevertheless, it will be understood that the modified arrangement shown in Figs. 18 to 22 inclusive may also be used in combination with these other elements, and for this purpose, I have shown the dial of an instrument, and have designated the same by the numeral 20 as in the previous arrangement.

This dial plate is also provided with the opening 21, through which is given the visible indication of miles per gallon.

A shaft 191 is carried by journals 192 and 193. Upon this shaft is mounted a sleeve 194 having the end collars 195 and 196 respectively.

The indicating drums 197 and 198 are mounted on the sleeve 194. Each of these drums is of generally barrel shape. The two drums are set close together as indicated in Fig. 18, and their adjacent ends are open and face each other.

These drums are journaled on the sleeve 194 by end plates 199 and 200 which set close to the flanges 195 and 196. The sleeve 194 also has the interior flanges 201 and 202 which operate with the inner faces of the end walls of the drums. Back and forth movement of the sleeve 194 thus shifts the drums back and forth on the shaft 191, but the drums are allowed to rotate with respect to the sleeve 194.

Each drum has on its face a series of numerals running around its periphery which designate miles per gallon. By shifting the sleeve 194 back and forth either drum can be brought into position to expose its numerals through the indicating opening 21.

Adjacent to the drums is a shaft 203 carried by the journals 204 and 205, which shaft 203 is rotated by the road travel of the vehicle. On the shaft 203 are the friction wheels 206 and 207 which are in position to engage one drum or the other depending upon the shifting of the sleeve 194 on the shaft 191. The friction wheels 206 and 207 are so spaced that when the sleeve 194 is shifted to bring the drum 197 into position in front of the opening 21, the other drum 198 will be engaged by the friction wheel 207, the first drum being disengaged from its friction wheel. A contrary action will take place when the sleeve 194 is shifted to the other extreme of its movement.

The drums preferably have their end portions slightly tapered as shown in Fig. 18, so that they can slip under the friction wheels as the sleeve 194 is shifted back and forth.

With this general arrangement it is intended that during the interval that one drum is exposed to the opening 21, the other drum shall be subjected to the road travel of the vehicle and thus rotate it through a distance depending upon such road travel. Assuming that said drum was first set back to zero, it will accumulate an indication equal to the amount of road travel. When the unit quantity of fuel (for example one quart) has been consumed, the sleeve 194 will be shifted so as to expose to view this drum and thus present to the operator an indication representing the travel reduced to the basis of miles per gallon.

The back and forth movements of the sleeve 194 are occasioned by a cylinder 208 having in its periphery a slot 209 which reaches twice around its surface in the general form of a figure eight. A finger 210 engages the flange 195 of the sleeve 194 and has an end tongue 211 which engages the slot 209. Upon causing the cylinder 208 to complete a revolution the sleeve 194 and the two drums will be shifted in one direction, and upon completing the next revolution of the cylinder the sleeve and the drums will be brought back to their initial position. It is, therefore, desired to rotate the cylinder 208 one revolution at the completion of each unit quantiy of fuel.

It is also desired to set each drum back to the zero position just before commencing the accumulation of a new quantity of road travel, so that such new quantity of road travel will correctly represent the total travel on the unit quantity of fuel. I, therefore, provide a finger 212 on the shaft 191, preferably directly in line with the dial plate opening 21, and extending through a slot 213 in the sleeve 194. The drum 197 has on its interior an abutment 214, and the drum 198 has on its interior an abutment 215, and the finger 212 on the shaft 191 will engage one or the other of these abutments depending upon which drum stands in position in front of the opening 21.

The arrangement is to be that the shaft 191 is rotated a revolution at the completion of the unit quantity of fuel and just before the sleeve 194 is shifted, so as to turn the exposed drum to the zero position immediately before it is shifted away from the opening 21 and into engagement with its friction wheel.

In connection with the foregoing, there are provided the stops 216 and 217 on the surfaces of the two drums, and the stationary stops 218 and 219 on the dial plate 20. These stops are relatively so positioned that at the instant the shaft 191 completes its resetting revolution the stop 216 or 217, as the case may be, will strike the stop 218 or 219, as the case may be, so as to prevent any other travel of the drum during resetting. Assurance is thus had that when the drum is carried under its friction wheel, it will stand at the zero position.

In connection with the foregoing, the shaft 191 is rotated during the resetting operating in the same direction that the drum was rotated during its accumulation of road travel, and the resetting finger 212 simply serves to complete the amount of rotation of the drum necessary to carry it clear around to the zero position.

It will now be evident that it is desired to first cause the shaft 191 to effect a revolution and then to cause the cylinder 208 to effect a revolution at the completion of the unit quantity of fuel. These results can be brought about in any desired manner. In the particular construction illustrated, I have provided star wheel movements similar to those previously explained in connection with the previously described construction.

The power necessary to bring about the rotation of the shaft 191 and the drum 208 may be derived from any suitable source as for example from the flow of the fuel itself (as is the case in the previously described construction), or from the road travel of the vehicle (as in the form which I will now describe) or from any other suitable source. Nevertheless, the movement of the parts, however driven, should be so controlled that they take place in proper sequence at the completion of the unit quantity of fuel.

In the particular construction illustrated

I provide a shaft 220 in line with the shaft 191 and cylinder 208 is rotatably mounted on the shaft 220. A spring 221 joins together the shafts 220 and 191, so that the shaft 220 can make a complete revolution while the shaft 191 lags behind, thus storing up power to be subsequently used. A star wheel connection 222 is placed between the shafts 220 and 191, so that the rotation of the shaft 191 is prevented until the shaft 220 completes its revolution. Thereupon the shaft 191 is released and makes a complete revolution under the influence of the spring 221. This serves to set the drum back to zero.

There is another star wheel connection 223 reaching from the shaft 191 backwardly to the cylinder 208, and a spring 224 is placed between the shaft 220 and the cylinder which spring tightens up as the shaft 220 is rotated so as to store up energy which can be released for rotation of the cylinder at the proper instant. The star wheel connection 223 causes the cylinder to be released immediately after the shaft 191 completes its revolution, so that the shifting of the sleeve 194 and drums does not take place until immediately after the drum has been set back to zero.

The shaft 220 is caused to effect a complete revolution upon the completion of each unit quantity of fuel or during the time that such unit quantity of fuel is being consumed. This can be done either by the flow of fuel itself or in various other ways. In the particular arrangement illustrated, I have provided a connection from the shaft 203 to the shaft 220 so that the road travel of the vehicle will store up the necessary power in the springs and thus relieve the fuel measuring device of this burden. This connection includes a gear wheel 225 on the shaft 203 meshing with a gear wheel 226 which is rotatably placed upon a disk 227, which disk in turn is rotatably mounted on the shaft 220. The gear wheel 226 co-operates with a friction plate 228 to grasp the disk 227 with a sufficient amount of friction to normally rotate the same with road travel of the vehicle, but this friction is not sufficient to cause damage to the parts in case the rotation of the disk 227 is prevented.

A spring 229 joins the disk 227 to the shaft 220. This spring is of sufficient capacity to store up enough energy before it becomes jammed to insure complete rotation of the shaft 220 when released at the completion of the unit quantity of fuel. The gear ratio between the gears 225 and 226 is such that the spring 229 will be completely wound up with a relatively small road travel of the vehicle, and in fact, a road travel smaller than will ordinarily be developed in the ordinary use of the vehicle. For example, if the vehicle will ordinarily develop twenty miles per gallon, the gear ratio should be such that a travel of say three or four miles will wind up the spring 229 after which time the gear 226 will slip on the disk 227. With this sort of an arrangement there will be assurance that the parts will be properly actuated even with a very small number of miles per gallon. If desired, also, the spring 229 can be given a sufficient number of turns to make it possible to develop several rotations of the shaft 220 with a single winding.

Another shaft 230 is placed in line with the shaft 220. This shaft 230 is rotated by the flow of fuel, and completes one revolution with each unit quantity of fuel. A star wheel connection 231 is placed between the shafts 220 and 230 and serves to release the shaft 220 at the completion of the unit quantity of fuel. The modified construction of Figs. 18 to 22 inclusive is the subject-matter of another divisional application for Letters Patent, and consequently I do not claim the same specifically herein.

It will be understood that while I have in the arrangement of Figs. 1 to 16 inclusive shown a construction in which the energy to operate the transferring mechanism comes from the fuel metering element, nevertheless, I contemplate also constructions in which the parts are so arranged that this energy may come from any other suitable source, such for example, as the road travel of the vehicle.

In like manner while I have shown in Figs. 1 to 16 inclusive an arrangement in which the periodical corrections of miles per gallon are transferred to a single indicator, the distance traveled being in the meantime accumulated on another element to be thence transferred to said indicator, I also contemplate the use of many other arrangements including for example such as those shown in Figs. 18 to 22 inclusive in which two or more indicators are brought successively into view in order to present other previous accumulations at the side openings.

Therefore, while I have herein shown and described only certain embodiments of the features of my present invention, still I do not intend to limit myself to the same except as I may do so in the claims.

I claim:

1. In an instrument for motor vehicles the combination of a device for indicating miles per gallon or the equivalent, a connection to the instrument operable by road travel of the vehicle, a connection to the instrument operable by consumption of gasoline, an accumulator, and means under the control of the gasoline consumption connection effective at the completion of a unit quantity of gasoline to first transfer the accumulated amount to the indicator and afterwards place the accumulator in connection with the road travel connection at the zero position, including a star wheel train and means for releasing the same at the completion of a unit quantity of gasoline, substantially as described.

2. In an instrument for motor vehicles the combination of a device for indicating miles per gallon or the equivalent, a connection to the instrument operable by road travel of the vehicle, a connection to the instrument operable by consumption of gasoline, an accumulator, means for causing the same to accumulate with road travel of the vehicle, transferring mechanism effective to transfer the accumulated amount to the indicator, and afterwards to place the accumulator in connection with the road travel connection at the zero position, including means for storing up energy during the interval in which the unit quantity of gasoline was being consumed, and a star wheel train for releasing said energy to the transferring mechanism at the completion of the unit quantity of gasoline, substantially as described.

3. In an instrument for motor vehicles the combination of a device for indicating miles per gallon or the equivalent, a connection to the instrument operable by consumption of gasoline, an accumulator normally in connection with the road travel connection, means for storing up energy during the road travel of the vehicle, and means for releasing said energy at the completion of a unit quantity of gasoline to thereby cause the amount accumulated to be transferred to the indicating device and to cause the accumulating device to be reset to the zero position and in connection with the road travel connection, substantially as described.

4. In an instrument for motor vehicles the combination of a device for indicating miles per gallon or the equivalent, a connection to the instrument operable by road travel of the vehicle, a connection to the instrument operable by consumption of gasoline, an accumulator, means for storing up energy during the road travel of the vehicle, and means under the control of the gasoline consumption connection for releasing the energy stored up to cause the amount accumulated to be transferred to the indicating device and to cause the accumulating device to be reset to the zero position and in connection with the road travel connection at the completion of the unit quantity of gasoline, substantially as described.

5. In a device of the class described, the combination of an indicator, markings in conjunction therewith designating ratio between two variables, a pair of companion cams having complementary surfaces, means for supporting said cams with said surfaces in alignment with each other, operative connections between one cam and said indicator operative effectively to cause said indicator to read according to the position of said cam, means normally retaining the other cam separated from and in alignment with the first mentioned cam, a friction wheel in conjunction with said other cam and normally in driving connection therewith, means for operating said friction wheel substantially in proportion to one variable, spring means tending to restore said cam to a zero position, and means operative at the completion of a unit quantity of the other variable effective to shift said other cam into full engagement with the indicator cam to thereby cause said indicator cam to assume a position dictated by the other cam, then to move the said other cam to position to disengage from the friction wheel, to thereby allow said cam to restore to zero position, then to move said cam back into engagement with the friction wheel, substantially as described.

6. In a device of the class described, the combination of an indicator, markings in conjunction therewith designating ratio between two variables, a pair of companion cams having complementary surfaces, means for supporting said cams with said surfaces in alignment with each other, one cam being an indicating cam and the other cam being an accumulator cam, means for connecting the indicating cam to the indicator, a friction wheel in position to normally drivingly engage the accumulator cam, means for driving said friction wheel substantially in proportion to one variable, spring means tending to restore the accumulator cam to a zero position, and means operative at the completion of a unit quantity of the other variable effective to first shift the accumulator cam into full engagement with the indicating cam to thereby cause the indicator to indicate according to the amount accumulated then to shift the accumulator cam to position to disengage from the friction wheel to allow the spring means to restore the accumulator cam to zero position, then to reengage the accumulator cam with the friction wheel, substantially as described.

7. In a device of the class described, the combination of an indicator, markings in conjunction therewith designating ratio between two variables, a pair of cams having complementary surfaces in alignment with each other, one cam being an indicating cam and the other cam being an accumulator cam, means for connecting the indicating cam to the indicator effective to cause the indicator to read according to the position of said cam, means tending to restore the accumulator cam to zero position, a friction wheel, means for driving the same substantially in proportion to the one variable, and means operative at the completion of a unit quantity of the other variable effective to cause the cams to engage with each other at the angular position of the accumulator cam, to thereby cause the indicating cam to read according to the accumulated amount of the accumulator cam, then to disengage the friction wheel from the accumulator cam, to allow the latter to restore to the zero position, and then to reengage the friction wheel with the accumulator cam, substantially as described.

8. In a device of the class described, means for indicating the ratio between two variables, including a pair of complementary cams, one of which is an accumulator cam and the other of which is an indicating cam, means for normally restoring the accumulator cam to a zero position, means for turning said cam substantially in proportion to one variable, and means operative at the completion of a unit quantity of the other variable, effective to shift the cams into full registry with each other at the angular position of the accumulator cam, to thereby cause the indicating cam to assume a position according to the accumulated amount of the accumulator cam, then to permit the accumulator cam to restore to zero position, and then to reengage the accumulator cam with the turning means, substantially as described.

9. In a device of the class described, the combination of a driving connection operative substantially in proportion to one variable, spring means in conjunction therewith operative to store up energy from said connection, an indicator actuator, means for turning the same from said driving connection and in proportion to the movement of the driving connection, an indicator means operative by said spring means effectively to cause said indicator actuator to move the indicator according to the turned position of the indicator actuator, and means under the control of another variable operative at the completion of a unit quantity of another variable to release the energy of the spring means to actuate the indicator into the indicating position substantially as described.

10. In a device of the class described, the combination of a driving connection operative substantially in proportion to one variable, spring means in conjunction therewith operative to store up energy from said connection, an indicator actuator, means for turning the same substantially in proportion to the movement of said driving connection, an indicator means for shifting said indicator actuator into engagement with said indicator by use of the spring energy aforesaid, and means under the control of another variable operative at the completion of a unit quantity of said other variable to release the spring energy aforesaid to shift the indicator actuator and indicator into indicating position, substantially as described.

THOMAS A. BANNING, Jr.